US006628321B1

(12) United States Patent
Nutaro

(10) Patent No.: US 6,628,321 B1
(45) Date of Patent: Sep. 30, 2003

(54) METHOD AND APPARATUS FOR SIMULATING VIEWS FROM A WINDOW

(75) Inventor: Joseph J. Nutaro, Phoenix, AZ (US)

(73) Assignee: Honeywell, Inc., Morristown, NJ (US)

( * ) Notice: Subject to any disclaimer, the term of this patent is extended or adjusted under 35 U.S.C. 154(b) by 0 days.

(21) Appl. No.: 09/224,216

(22) Filed: Dec. 30, 1998

(51) Int. Cl.[7] ................................................ H04N 7/18
(52) U.S. Cl. .......................... 348/41; 348/40; 348/840
(58) Field of Search .......................... 348/64, 113–118, 348/142–160, 40–41, 840

(56) References Cited

U.S. PATENT DOCUMENTS

| 4,740,779 A | * | 4/1988 | Cleary et al. | 340/705 |
|---|---|---|---|---|
| 5,175,575 A | * | 12/1992 | Gersuk | 353/94 |
| 5,227,786 A | * | 7/1993 | Hancock | 340/961 |
| 5,659,475 A | * | 8/1997 | Brown | 364/439 |
| 5,670,961 A | * | 9/1997 | Tomita et al. | 342/36 |
| 5,774,569 A | * | 6/1998 | Waldenmaier | 382/100 |
| 5,963,247 A | * | 10/1999 | Banitt | 348/121 |

* cited by examiner

*Primary Examiner*—Andy Rao

(57) ABSTRACT

A remote viewing system for simulating the views from a window includes a camera assembly and a remote viewing assembly. The camera assembly obtains views of a site and transmits the views to the remote viewing assembly. The viewing assembly then displays the views to simulate the various perspectives which can be obtained from looking out of a window, such as looking up and down out of the window.

25 Claims, 5 Drawing Sheets

METHOD AND APPARATUS FOR SIMULATING VIEWS FROM A WINDOW

BACKGROUND OF THE INVENTION

1. Field of the Invention

The present invention generally relates to remote viewing systems, and more particularly, to a system for simulating the views of an airport from a control tower using high resolution cameras and monitors configured as virtual windows.

2. Description of the Related Art

In general, a control tower at an airport controls the movement of airplanes on the ground and in the air near the airport. More particularly, controllers working in the control tower typically direct airplanes landing on and taking-off from runways as well as the movement of airplanes on the ground. For example, when an airplane is ready to depart from a gate, a controller issues taxiing instructions to safely direct the movement of the airplane from the gate to a runway for takeoff. Additional instructions are provided from the control tower to direct the departing airplane into an outgoing track to ensure proper separation between departing airplanes. Similarly, as an arriving airplane approaches the airport for landing, a controller in the control tower determines the landing sequences and stacking instructions to guide the airplane safely into an approach pattern. The arriving airplane is visually acquired from the control tower during its final descent onto the runway to help ensure the airplane's safe landing on the proper runway. After landing, a controller in the control tower issues taxiing instructions to safely guide the airplane from the runway to the proper arrival gate.

In order to safely direct the movement of airplanes in the air and on the ground, control towers are typically built to provide a clear view of the various areas of the airport grounds such as the arrival and departure gates, the runways, and the taxiing lanes. With reference to FIG. 1, a conventional control tower 100 typically includes an observation deck 102 mounted on a support base 104. The observation deck is typically enclosed in large windows and raised high to provide a clear view of the airport. Conventional control towers, however, are typically costly and require considerable planning and time to construct, and typically cannot be moved once they are constructed in a particular location. Additionally, conventional control towers are typically located a considerable distance away from the optimal locations to observe the runways in order to avoid interfering with arriving and departing airplanes.

SUMMARY OF THE INVENTION

The present invention relates to a remote viewing system for simulating the views from a window. In accordance with an exemplary embodiment of the present invention, the remote viewing system includes a camera assembly and a remote viewing assembly. The camera assembly obtains views of a site and transmits the views to the remote viewing assembly. The viewing assembly then displays the views to simulate the various perspectives which can be obtained from looking out of a window, such as looking up and down out of the window.

In an exemplary application of the present invention, the remote viewing system is configured to simulate the views from a control tower at an airport. The camera assembly is located at an airport to obtain views of airplanes landing and departing and the movement of the airplanes on the airport grounds. The remote viewing assembly then displays the views obtained by the camera assembly to simulate the views from the windows of the control tower.

DESCRIPTION OF THE DRAWINGS

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which like parts may be referred to by like numerals:

DETAILED DESCRIPTION OF THE PREFERRED EXEMPLARY EMBODIMENT

In accordance with various aspects of the present invention, the subject matter of the present invention is particularly suited for use as a remote viewing system to simulate views from a control tower at an airport. As a result, an exemplary embodiment of the present invention is described in that context. It should be recognized, however, that such description is not intended as a limitation on the use or applicability of the present invention, but is instead provided to enable a full and complete description of the exemplary embodiment.

Figure 1:
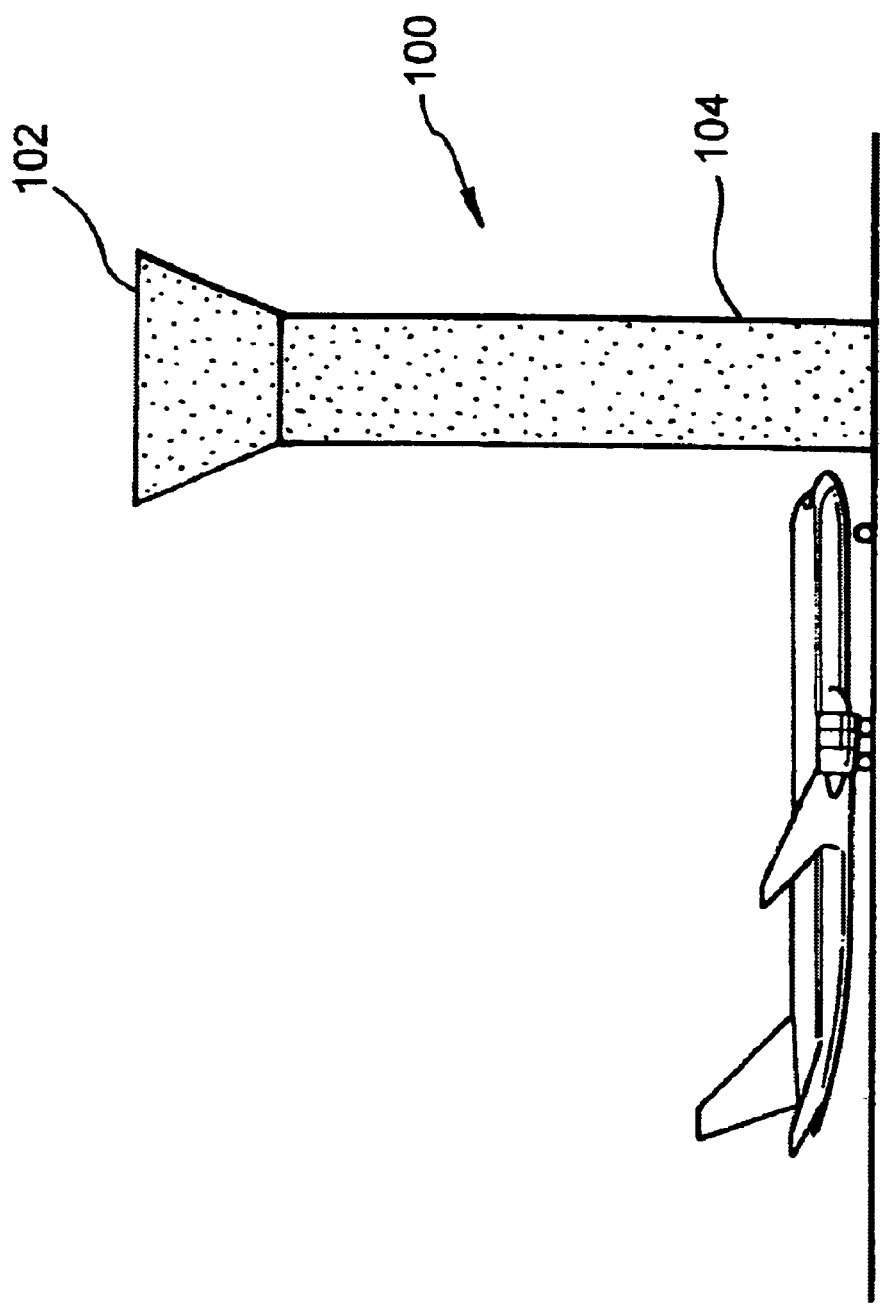
FIG. 1 is a side view of a prior art control tower at an airport.
Figure 2:
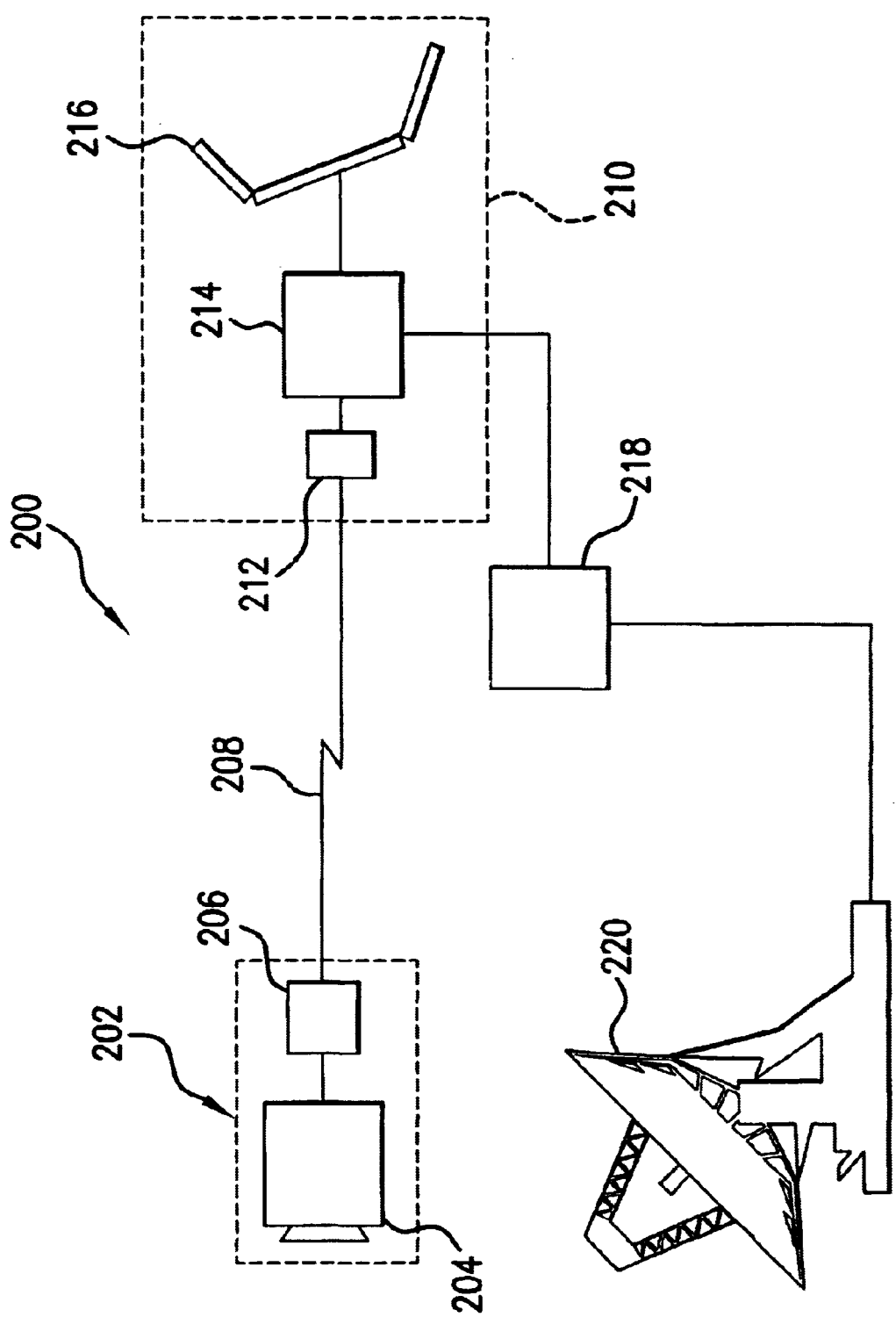
FIG. 2 is a schematic of a remote viewing system according to various aspects of the present invention.
Figure 3:
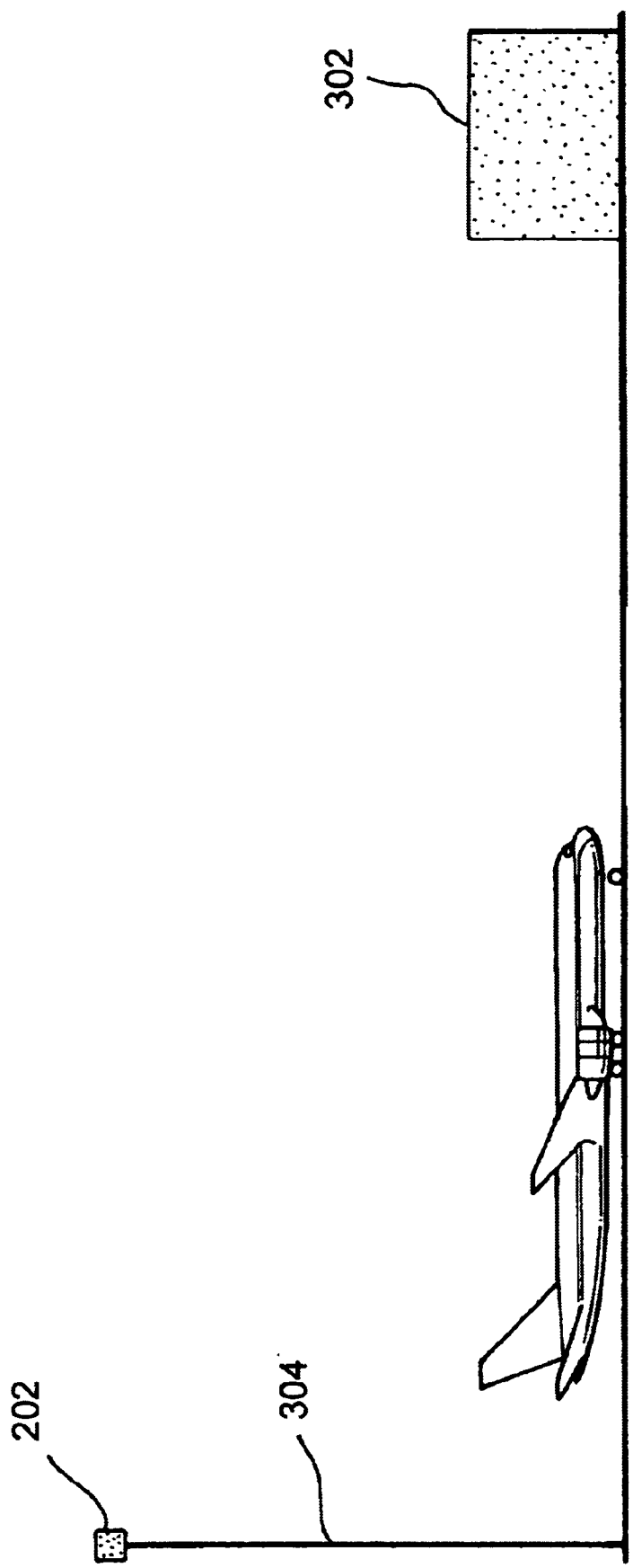
FIG. 3 is a side view of a virtual control tower system using a remote viewing system according to various aspects of the present invention.

With reference to FIGS. 2 and 3, a remote viewing system 200 according to various aspects of the present invention suitably includes a camera assembly 202 and a remote viewing assembly 210. In an exemplary application of the present exemplary embodiment, the remote viewing system 200 is preferably configured as a virtual control tower at an airport. In this regard, in the present exemplary embodiment, the camera assembly 202 is suitably mounted on a tower 304 and located at any desirable site for obtaining a desired view of the airport. Alternatively, the camera assembly 202 can be mounted on any convenient structure to obtain the desired view, such as a pole, building, scaffold, and the like. Additionally, any number of camera assemblies 202 can be used for obtaining any number of desired views depending on the particular application.

As will be described in greater detail below, the camera assembly 202 according to various aspects of the present invention suitably transmits the desired views of the airport to the remote viewing assembly 210. Unlike conventional control towers, however, the remote viewing assembly 210 can be located in any convenient location, including locations which are remote from the airport. As depicted in FIG. 3, in the present exemplary embodiment, the remote viewing assembly 210 is suitably located within a remote control room 302.

In this manner, the various views needed to safely direct the movement of airplanes on the ground and in the air near the airport can be obtained and displayed without constructing a large conventional control tower. Additionally, the remote viewing system 200 according to various aspects of the present invention is easily reconfigurable and mobile. For example, the remote viewing system 200 is particularly well suited for use in an application where temporary airfields need to be constructed quickly, such as in civil defense, disaster recover, and the like. As alluded to above, the remote viewing assembly 210 can be quickly deployed to the field by locating the remote viewing assembly 210 within a mobile structure, such as in a trailer, a truck, an airplane, and the like. Similarly, as the camera assembly 202 can be mounted on a pole, the camera assembly 202 also can be quickly deployed in the field and suitably linked to the remote viewing assembly 210. When the temporary airfield is no longer needed or is moved to another location, the remote viewing assembly 210 and the camera assembly 202 can be quickly disassembled and moved.

With reference to FIG. 2, in accordance with various aspects of the present invention, the camera assembly 202 preferably includes a camera 204 and a communication interface 206. As will be described in greater detail below, in addition to obtaining desired views of the airport, the camera 204 is suitably configured to obtain various visual perspectives. For example, in addition to obtaining the visual perspective of an observer looking directly ahead, the camera 204 according to various aspects of the present invention is suitably configured to obtain the visual perspectives of an observer looking up and down. Accordingly, the camera 204 is suitably configured as a single camera with a wide field of view or a cluster of cameras configured to obtain the various visual perspectives.

Additionally, in accordance with various aspects of the present invention, the camera 204 is preferably configured to operate beyond the visual spectrum. For example, the camera 204 can be suitably configured to obtain infrared views for use at night and in adverse weather conditions, such as fog, snow, and the like, when normal vision would be obscured. The camera 204 in accordance with various aspects of the present invention can include any high resolution camera configured to produce a high fidelity image of airplanes landing and departing and the movement of the airplanes on the airport grounds.

Additionally, the camera 204 can be configured with any convenient image stabilization system for reducing shaking or jittering due to vibration. The image stabilization system can be implemented as a hardware system, a software system, or any combination thereof. For example, the camera 204 can be mounted on the tower 304 (FIG. 3) with a vibration dampening device. In this manner, high resolution steady images of the desired views of the airport can be obtained.

The communication interface 206 suitably transmits the views obtained by the camera 204 through a communication medium 208. The communication interface 206 can be implemented as a separate device or integrated as a component of the camera 204. The communication medium 208 can include any convenient direct wiring such as coaxial cable, twisted pair cable, fiber optic cable, and the like. Alternatively, the communication medium 208 can include any convenient aerial broadcast frequency for wireless transmission of the views.

The views obtained by the camera 204 and transmitted by the communication interface 206 are then received, processed and displayed at remote viewing assembly 210. More particularly, a communication interface 212 receives the views transmitted through the communication medium 208. As will be described in greater detail below, an view processor 214 suitably processes the views and then displays the views on a virtual window 216. The view processor 214 can be implemented using any convenient computer technology. Additionally, the communication interface 212 and the view processor 214 can be implemented as separate devices or components of a single device. For example, in an exemplary embodiment, the view processor 214 and communication interface 212 can be implemented as a computer terminal configured with appropriate hardware and software components to receive the views transmitted by the camera assembly 202.

Figure 4:
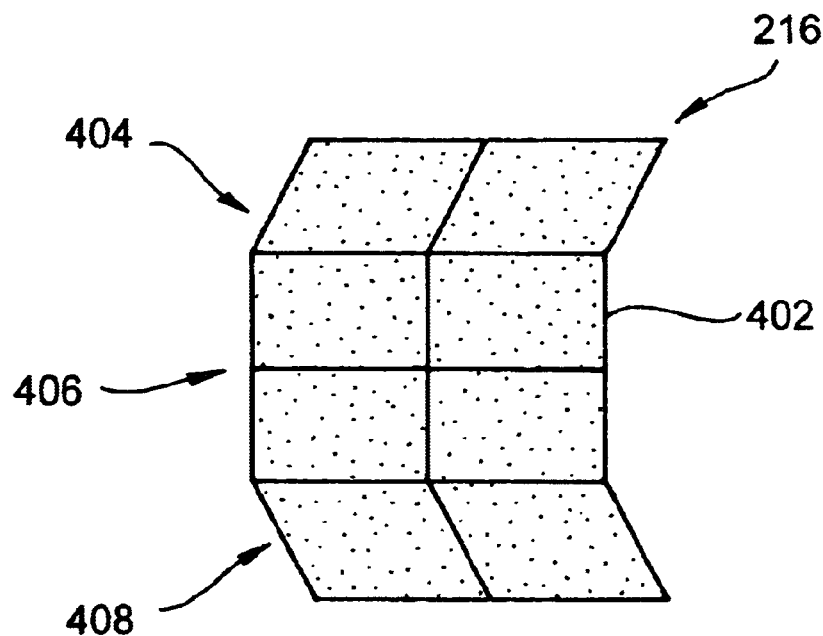
FIG. 4 is a front view of a virtual window in accordance with various aspects of the present invention.

With additional reference to FIG. 4, the virtual window 216 according to various aspects of the present invention suitably includes one or more display tiles 402, each of which are configured to display a portion of the complete views to be displayed on the virtual window 216. The view processor 214 according to various aspects of the present invention suitably spreads any one of the views between the display tiles 402. In an exemplary embodiment, the display tiles 402 include high resolution liquid crystal displays (available from Honeywell Inc. of Phoenix, Ariz.). However, any convenient high resolution displays with sufficient acuity to safely monitor and detect landing and departure of airplanes and the movement of airplanes on the airport grounds can be used.

Figure 5:
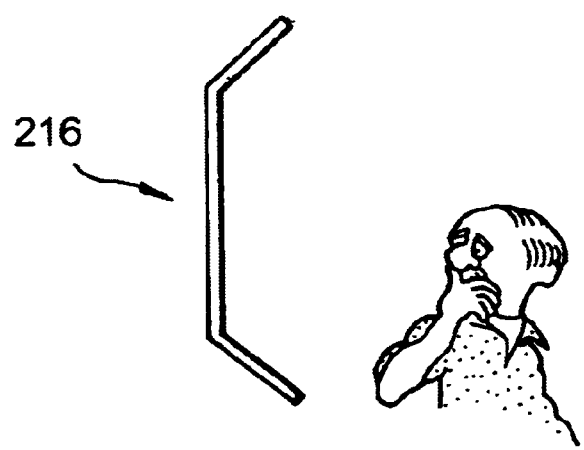
FIG. 5 is a side view of the virtual window shown in FIG. 4.

Additionally, the display tiles 402 can be formed into panels which can be oriented with various viewing angles to simulate a wider field of view and to provide alternative viewing perspective as described above. For example, in an exemplary embodiment, the display tiles 402 are configured to form a substantially vertical panel 406 and slanted panels 404 and 408 to simulate the various visual perspective which can be obtained when viewing out of an actual window. More particularly, with additional reference to FIG. 5, the substantially vertical panel 406 provides the visual perspective of an observer looking straight out of a window. The slanted panels 404 and 408 provide the visual perspective of an observer looking up and looking down out of the window, respectively. As described above, the camera 204 is suitably configured to obtain the various perspectives and to transmit the perspectives to the view processor 214 which suitably orients them on panels 404, 406 and 408.

Figure 6:
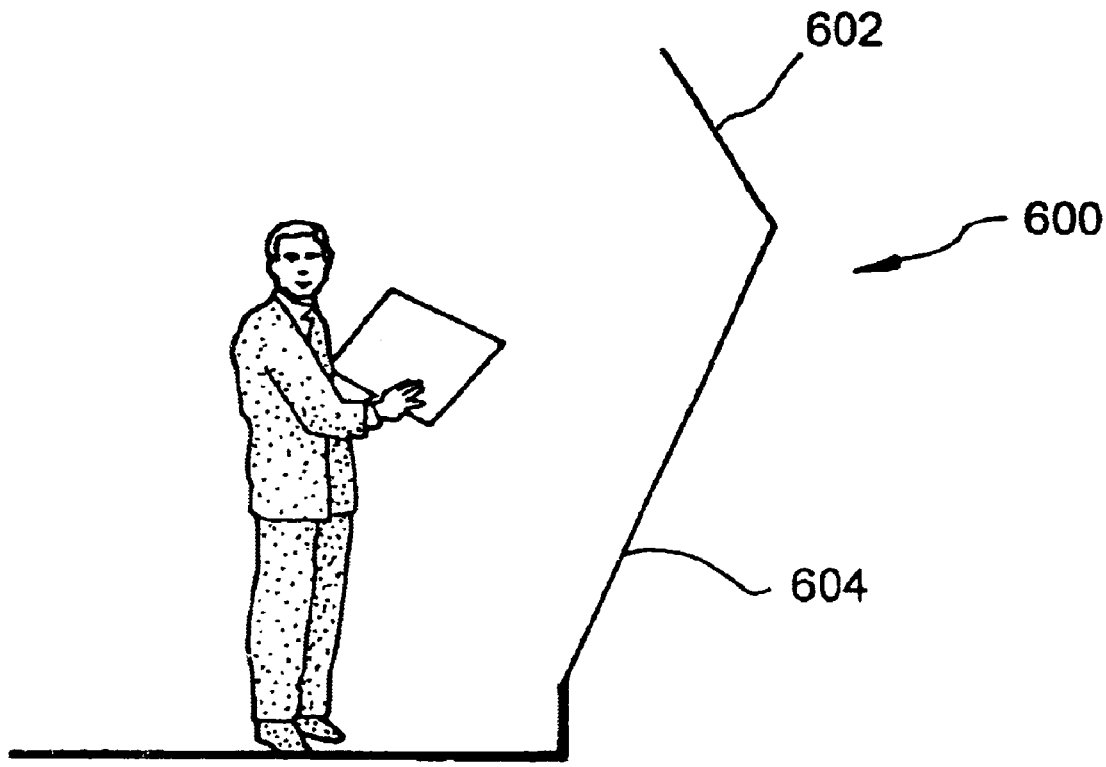
FIG. 6 is a side view of an alternative configuration of a virtual window in accordance with various aspects of the present invention.

In this manner, any number of display tiles 402 can be integrated into a matrix of any desirable shape, size and configuration depending on the particular application. For example, with reference to FIG. 6, in the present application of the present invention as a virtual control tower, a virtual window 600 suitably includes slanted panels 602 and 604 configured to simulate the large panel windows of a control tower. More particularly, with additional reference to FIG. 3, the virtual control tower 302 can be configured with a suitable number of the virtual windows 600 to provide a 360 degree virtual view. In this manner, the controllers working inside of the virtual control tower 302 can be provided virtual views of the airport grounds through one or more camera assemblies 202 to simulate an actual control tower.

However, as stated above, unlike a conventional control tower, the virtual control tower 302 can be located any desirable distance away from the airport grounds. Additionally, the remote viewing system 200 can be suitably configured to provide views which would be difficult to obtain in an actual control tower. For example, with additional reference to FIG. 2, the view processor 214 can be suitably connected to a computer 218 which is connected to a radar system 220. In accordance with various aspects of the present invention, the view processor 214 obtains from the computer 218 flight information, such as air speed, altitude, flight number, and the like, of airplanes near the airport and displays this information on the virtual window 216 next to the images of the airplanes. Thus, a controller working in a virtual flight control tower according to various aspects of the present invention can visually acquire an incoming or departing airplane on the virtual window 216 then view relevant flight information related to that airplane. Additionally, the remote viewing system 200 is suitably configured to provide magnified views, multiple views, and enhanced low-light or low-visibility magnification using any convenient method.

Although the present invention has been described in conjunction with particular embodiments illustrated in the appended drawing figures, various modifications may be made without departing from the spirit and scope of the invention. For example, a remote viewing system according to various aspects of the present invention can be configured as observation towers at seaports, construction sites, hazardous sites, traffic sites, and the like. Also, a remote viewing system according to various aspects of the present invention can be configured to obtain views which are otherwise difficult to obtain such as the view from a mountain top, from under the sea, and the like. Therefore, the present invention should not be construed as limited to the specific form shown and described above.

What is claimed:

1. A remote viewing system for acquiring and displaying real-time images to reflect an actual picture of an airport environment such as would be seen from the window of an air traffic control tower, comprising:
    a camera assembly configured to obtain images of the airport in real-time; and
    a remote viewing assembly configured to receive said images from said camera assembly and to display said images of the airport in real-time in such a manner as to simulate a view from the window of the air traffic control tower.

2. A remote viewing system in accordance with claim 1, wherein the camera assembly further comprises a high resolution camera.

3. A remote viewing system in accordance with claim 2, wherein said camera is configured to obtain a wide field of view including different visual perspectives.

4. A remote viewing system in accordance with claim 1, wherein said camera assembly further comprises an array of high resolution cameras.

5. A remote viewing system in accordance with claim 2, wherein said camera is mounted on a tower.

6. A remote viewing system in accordance with claim 1, wherein said remote viewing assembly further comprises a virtual window configured to provide the visual perspective of looking out of a window.

7. A remote viewing system in accordance with claim 6, wherein said virtual window comprises a first slanted panel configured to provide the visual perspective of looking up out of a window and a second slanted panel configured to provide the visual perspective of looking down out of a window.

8. A remote viewing system in accordance with claim 7, wherein said virtual window further comprises a third substantially vertical panel to provide the visual perspective of looking straight out of a window.

9. A remote viewing system in accordance with claim 6, wherein said virtual window comprises a plurality of display panels configured into a matrix.

10. A remote viewing system in accordance with claim 9, wherein each of said plurality of display panels is a liquid crystal display.

11. A remote viewing system in accordance with claim 1, wherein said camera assembly is located at an airport to capture views of airplanes landing and departing from the airport and movement of airplanes on the airport grounds.

12. A remote viewing system in accordance with claim 11, wherein said remote viewing assembly is configured to display views of airplanes landing and departing from an airport and movement of airplanes on the airport grounds to simulate the views from a control tower.

13. A remote viewing system in accordance with claim 12, wherein said remote viewing assembly is further configured to display flight information of airplanes in conjunction with views of the airplanes.

14. A remote viewing system for acquiring and displaying real-time images to reflect an actual picture of an airport environment such as would be seen from the window of an air traffic control tower, comprising:
    a camera assembly for obtaining real-time views of the airport, said camera assembly being configured to transmit the views of the airport in real-time; and
    a remote viewing assembly configured to communicate in real-time with said camera assembly, said remote viewing assembly further configured to receive and display the views of the airport in real-time to simulate the views of the airport from the control tower.

15. A remote viewing system in accordance with claim 14, wherein said camera assembly further comprises a high resolution color camera for obtaining views of the airport and a first communication interface for transmitting the views of the airport.

16. A remote viewing system in accordance with claim 15, wherein said remote viewing assembly further comprises:
    a second communication interface for receiving the views of the airport transmitted by said first communication interface;
    an view processor for processing the received views of the airport; and
    a virtual window for displaying the processed views of the airport, wherein said virtual window is configured to simulate the perspectives of looking up and down out of the windows of the control tower.

17. A method of simulating a control tower at an airport comprising the steps of:
    obtaining real-time views of the airport using a camera assembly, wherein the views comprise views of aircraft near the airport;
    displaying views of the airport obtained by the camera assembly using a virtual window to simulate the views from the windows of the control tower; and
    directing the movement of the aircraft based upon the views shown on the virtual window.

18. A method of simulating a control tower at an airport in accordance with claim 17, wherein the obtaining step further comprises the step of obtaining various visual perspectives.

19. A method of simulating a control tower at an airport in accordance with claim 17, wherein the displaying step further comprises the step of displaying on the virtual window the various visual perspectives obtained by the camera assembly to provide a visual effect of looking up and down out of the windows of the control tower.

20. A method of simulating a control tower at an airport in accordance with claim 19, wherein the displaying step further comprises the step of displaying on the virtual window flight information of airplanes being displayed on the virtual window.

21. The remote viewing system of claim 14 wherein the remote viewing assembly is further configured to receive and display the views of the airport in real-time.

22. The method of claim 17 wherein the virtual window presents the views in real-time.

23. The remote viewing system of claim 1 wherein the remote viewing assembly is further configured to enhance the images of the site.

24. The remote viewing system of claim 23 wherein the images comprise infrared images.

25. The remote viewing system of claim 23 wherein the remote viewing assembly is further configured to display aircraft and flight information associated with the aircraft on a virtual window.

* * * * *